United States Patent
Lee et al.

(10) Patent No.: US 8,919,991 B2
(45) Date of Patent: Dec. 30, 2014

(54) TUBE-TYPE LED ILLUMINATION LAMP

(71) Applicant: Kumho Electric, Inc., Seoul (KR)

(72) Inventors: Jong Chan Lee, Gyeonggi-do (KR); Min-Su Kim, Gyeonggi-do (KR); Chan Jun Park, Gyeonggi-do (KR)

(73) Assignee: Kumho Electric, Inc., Seoul (KR)

( * ) Notice: Subject to any disclaimer, the term of this patent is extended or adjusted under 35 U.S.C. 154(b) by 0 days.

(21) Appl. No.: 14/018,501

(22) Filed: Sep. 5, 2013

(65) Prior Publication Data
US 2014/0254145 A1    Sep. 11, 2014

(30) Foreign Application Priority Data
Mar. 11, 2013   (KR) .......................... 10-2013-0025802

(51) Int. Cl.
*F21V 19/00*   (2006.01)
*F21V 29/00*   (2006.01)

(52) U.S. Cl.
CPC .............. *F21V 19/008* (2013.01); *F21V 29/004* (2013.01); *F21V 29/2206* (2013.01)
USPC ........................................................ 362/218

(58) Field of Classification Search
USPC .................... 362/249.02, 218, 235, 296.01
See application file for complete search history.

(56) References Cited

U.S. PATENT DOCUMENTS

2012/0327646 A1*  12/2012  Ivey et al. ..................... 362/218

FOREIGN PATENT DOCUMENTS

| JP | 2013-026131 A | 2/2013 |
|---|---|---|
| KR | 20-2010-0007040 U | 7/2010 |
| KR | 10-2011-0100826 A | 9/2011 |

OTHER PUBLICATIONS

Takamura, Hiroji, Japanese Patent Application publication 2013-0216131, Feb. 2013, machine translation.*

* cited by examiner

*Primary Examiner* — Tracie Y Green
(74) *Attorney, Agent, or Firm* — Rabin & Berdo, P.C.

(57) ABSTRACT

A tube-type light-emitting diode (LED) illumination lamp is provided. The tube-type LED illumination lamp includes at least one printed circuit board on which at least one LED is placed, and a heat dissipation cover that has at least one seating surface on which the printed circuit board is mounted. The seating surface is obliquely formed such that each printed circuit board is mounted on each inclined surface. According to the present invention, since a light diffusion angle is increased by obliquely positioning the printed circuit board on which the LED is placed, illuminance quality of the tube-type LED illumination lamp can be improved.

9 Claims, 14 Drawing Sheets

FIG. 1

PRIOR ART

FIG. 2

PRIOR ART

FIG. 3

PRIOR ART

TUBE-TYPE LED ILLUMINATION LAMP

CROSS-REFERENCE TO RELATED APPLICATION

This application claims priority to and the benefit of Korean Patent Application No. 10-2013-0025802, filed on Mar. 11, 2013, the disclosure of which is incorporated herein by reference in its entirety.

BACKGROUND

1. Field of the Invention

The present invention relates to a tube-type light-emitting diode (LED) illumination lamp, and more particularly, to a tube-type LED illumination lamp that can increase a light diffusion angle by obliquely positioning a printed circuit board on which an LED is placed.

2. Discussion of Related Art

In general, a light-emitting diode (LED) has a smaller size, a longer lifetime, less power consumption, and higher energy efficiency than a conventional light source.

Accordingly, various illumination lamps using an LED as a light source have been developed, and tube-type LED illumination lamps which may replace existing fluorescent lamps have recently been suggested.

Figure 1:
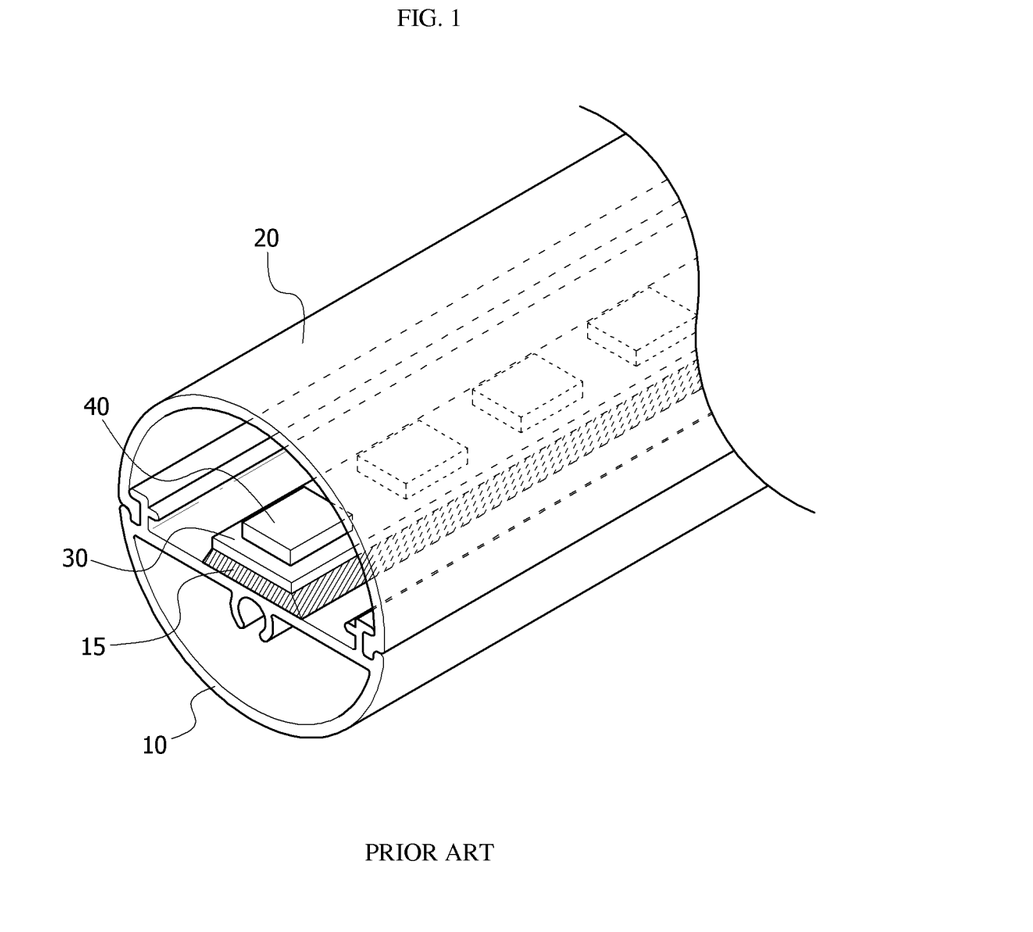
FIG. 1 is a perspective view schematically illustrating a conventional tube-type light-emitting diode (LED) illumination lamp.
Figure 2:
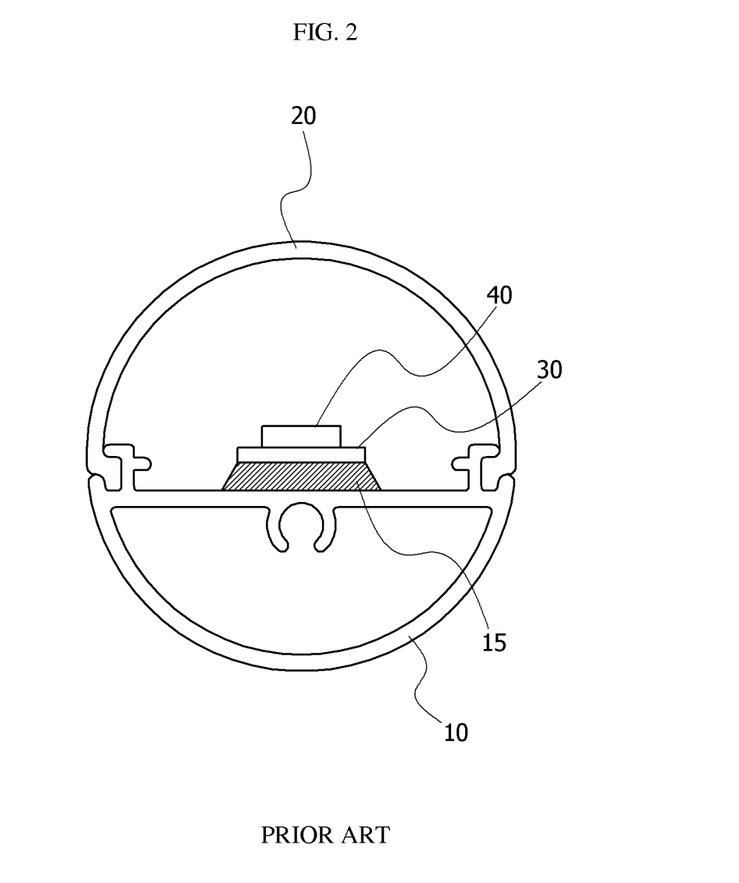
FIG. 2 is a cross-sectional view illustrating the conventional tube-type LED illumination lamp of FIG. 1.
Figure 3:
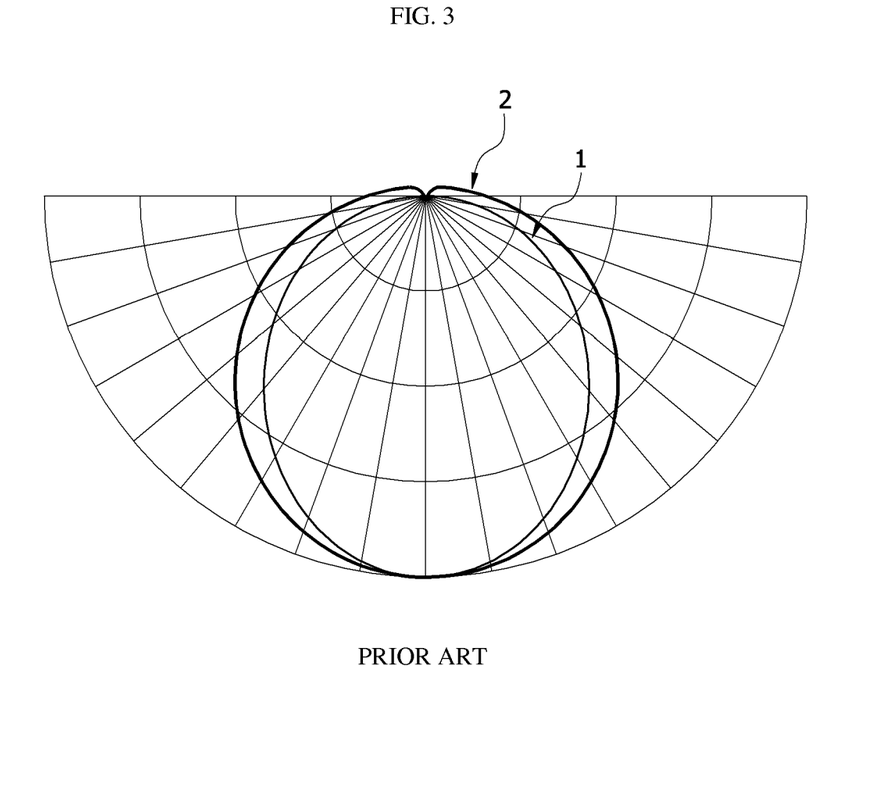
FIG. 3 is a view illustrating a light distribution curve of the conventional tube-type LED illumination lamp of FIG. 1.

FIG. 1 is a perspective view illustrating a conventional tube-type LED illumination lamp. FIG. 2 is a cross-sectional view illustrating the conventional tube-type LED illumination lamp of FIG. 1. FIG. 3 is a view illustrating a light distribution curve of the conventional tube-type LED illumination lamp of FIG. 1.

Referring to FIGS. 1 and 2, the conventional tube-type LED illumination lamp is configured such that a printed circuit board 30, on which LEDs 40 are arranged at predetermined intervals, is mounted on a top surface of a support member 15 that is formed to be parallel to a seating surface of a heat dissipation cover 10.

However, in this configuration, since a light diffusion angle is less than that of a general fluorescent lamp, because the LEDs 40 have excellent light directivity, an illuminance at a side is low, as shown in FIG. 3 (refer to 2).

That is, although an LED has a high illuminance at a center, an overall illuminance (indoor illuminance) is disadvantageously low. To overcome this disadvantage, more illumination lamps have to be installed.

SUMMARY OF THE INVENTION

The present invention is directed to providing a tube-type light-emitting diode (LED) illumination lamp that may improve illuminance quality by obliquely positioning a printed circuit board on which an LED is placed to increase a light diffusion angle.

One aspect of the present invention provides a tube-type light-emitting diode (LED) illumination lamp including: at least one printed circuit board on which at least one LED is placed; and a heat dissipation cover that has at least one seating surface on which the printed circuit board is disposed, wherein the seating surface is obliquely formed such that each printed circuit board is mounted on each inclined surface.

A mounting groove may be formed in the inclined surface, and the printed circuit board may be fixed to a bottom surface of the mounting groove.

The mounting groove may be formed to taper toward the bottom surface.

A protrusion may be formed on an inner wall of the mounting groove, and the printed circuit board is fixed to the bottom surface due to the protrusion when being inserted into the mounting groove.

The tube-type LED illumination lamp may further include a reflective plate that is provided on an inner wall of the mounting groove.

The tube-type LED illumination lamp may further include: a reflective mirror that is provided on an inner wall of the mounting groove; and a lens that is provided over the reflective mirror and the LED.

A heat absorption plate may be disposed between the printed circuit board and the bottom surface of the mounting groove.

The inclined surface may be formed by mounting a support member having an inclined surface on the heat dissipation cover.

An angle between two inclined surfaces of the heat dissipation cover may be equal to or greater than 30° and equal to or less than 105°.

A plurality of heat dissipation fins may be formed under the seating surface.

Another aspect of the present invention provides a tube-type light-emitting diode (LED) illumination lamp including: a heat dissipation cover that has a seating surface; a support member that is provided on the seating surface and has a top surface in which at least one mounting groove is formed; and at least one printed circuit board that is fixed to a bottom surface of the mounting groove and has a top surface on which at least one LED is placed, wherein the bottom surface of the mounting groove is obliquely formed with respect to the seating surface.

BRIEF DESCRIPTION OF THE DRAWINGS

The above and other objects, features and advantages of the present invention will become more apparent to those of ordinary skill in the art by describing in detail exemplary embodiments thereof with reference to the attached drawings, in which.

DETAILED DESCRIPTION OF EXEMPLARY EMBODIMENTS

As the invention allows for various changes and numerous embodiments, particular embodiments will be illustrated in the drawings and described in detail in the written description. However, this is not intended to limit the present invention to particular modes of practice, and it is to be appreciated that all changes, equivalents, and substitutes that do not depart from the spirit and technical scope of the present invention are encompassed in the present invention.

Although the terms first, second, etc. may be used to describe various elements, these elements are not limited by these terms. These terms are only used to distinguish one element from another. For example, a first element could be termed a second element, and, similarly, a second element could be termed a first element, without departing from the scope of exemplary embodiments. The term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

The terminology used herein is for the purpose of describing particular embodiments only and is not intended to be limiting of exemplary embodiments. The singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, components and/or groups thereof, but do not preclude the presence or addition of one or more other features, integers, steps, operations, elements, components and/or groups thereof.

Unless otherwise defined, all terms (including technical and scientific terms) used herein have the same meaning as commonly understood by one of ordinary skill in the art to which exemplary embodiments belong. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

With reference to the appended drawings, exemplary embodiments of the present invention will be described in detail below. To aid in understanding the present invention, like reference numerals refer to like elements throughout the description of the figures, and descriptions of the same elements will be not reiterated.

Figure 4:
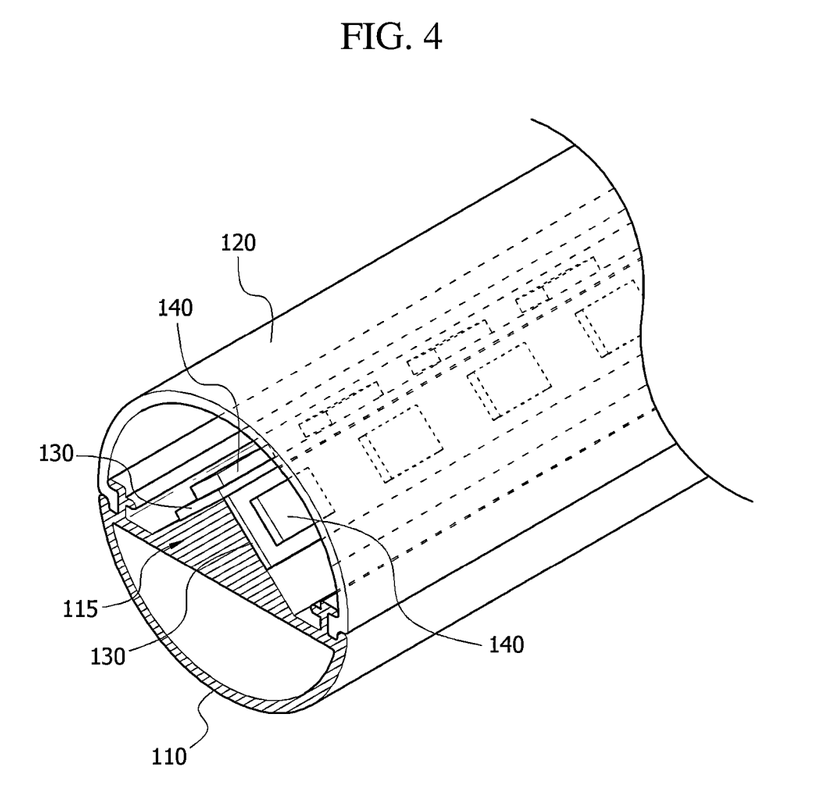
FIG. 4 is a perspective view schematically illustrating a tube-type LED illumination lamp according to an embodiment of the present invention.
Figure 5:
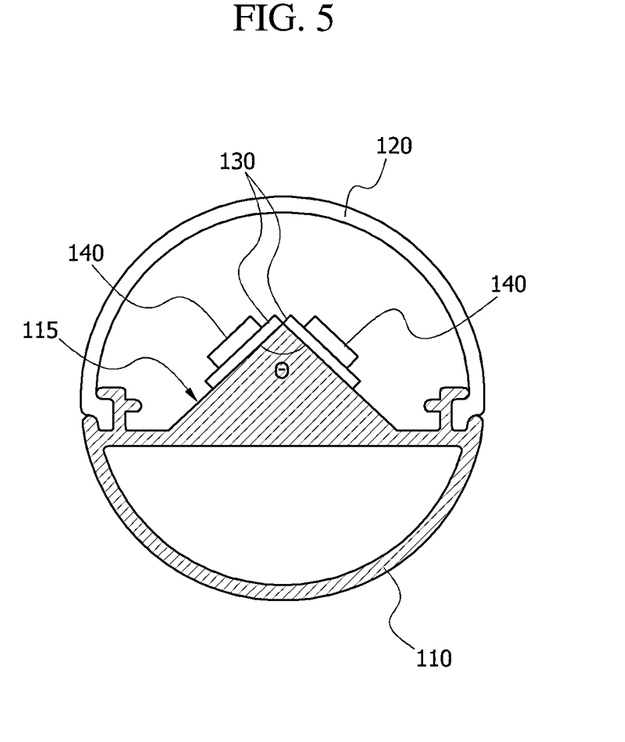
FIG. 5 is a cross-sectional view illustrating the tube-type LED illumination lamp of FIG. 4.
Figure 6:
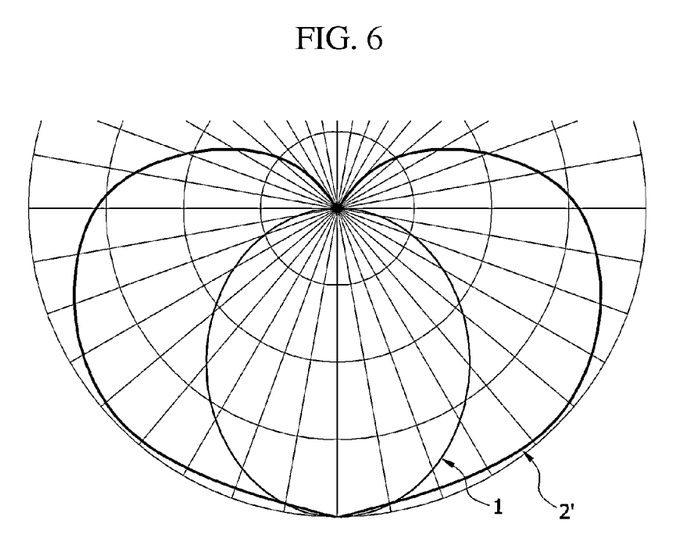
FIG. 6 is a view illustrating a light distribution curve of the tube-type LED illumination lamp of FIG. 4.
Figure 7:
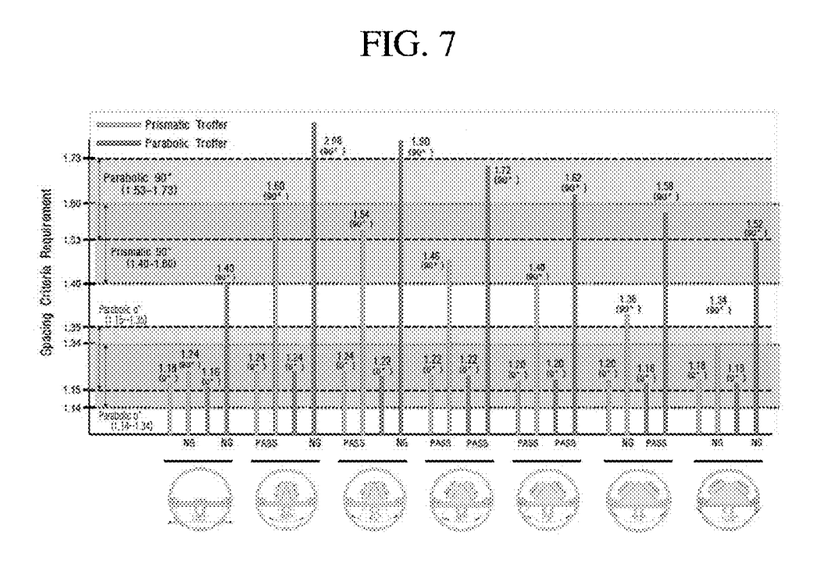
FIG. 7 is a view for explaining whether DesignLights Consortium (DLC) certification requirements are met according to a change in an angle between two inclined surfaces in the tube-type LED illumination lamp of FIG. 4.

FIG. 4 is a perspective view schematically illustrating a tube-type light-emitting diode (LED) illumination lamp according to an embodiment of the present invention. FIG. 5 is a cross-sectional view illustrating the tube-type LED illumination lamp of FIG. 4. FIG. 6 is a view illustrating a light distribution curve of the tube-type LED illumination lamp of FIG. 4. FIG. 7 is a view for explaining whether DesignLights Consortium (DLC) certification requirements are met according to a change in an angle between two inclined surfaces in the tube-type LED illumination lamp of FIG. 4.

Referring to FIGS. 4 and 5, the tube-type LED illumination lamp according to an embodiment of the present invention includes a heat dissipation cover 110, a light-transmitting cover 120, a printed circuit board 130, and an LED 140.

The heat dissipation cover 110 has a seating surface on which the printed circuit board 130 is mounted. The printed circuit board 130, on which at least one LED 140 is arranged, is mounted on the seating surface.

In this case, the seating surface of the heat dissipation cover 110 is obliquely formed, and as each printed circuit board 130 is mounted on each inclined surface, the printed circuit board 130 may be obliquely positioned.

When two printed circuit boards 130 are obliquely positioned, a diffusion angle of light emitted by the LED 140 can be increased as shown in FIG. 6 (refer to 2'), thereby improving illuminance quality of the tube-type LED illumination lamp.

As shown in FIG. 5, the heat dissipation cover 110 may be configured to have inclined surfaces collectively having a 'Δ' shape or '∧' shape. However, the number and shapes of inclined surfaces of the heat dissipation cover 110 may vary according to a product or a designer's intentions.

For example, the heat dissipation cover 110 may be configured to have one inclined surface having a '◺' shape or two or more inclined surfaces collectively having a '◻' shape.

Also, although it is preferable that two inclined surfaces have the same gradient and the same length, two inclined surfaces may have different gradients and different lengths according to a product or a designer's intentions.

An angle θ between the two inclined surfaces of the heat dissipation cover 110 may be a value in an appropriate range to meet DLC certification requirements.

DLC which has established a set of certification requirements for products in North America certifies products through predetermined tests to guarantee high quality and high performance of illumination systems. The DLC certifies energy efficient products in North America along with Energy Star.

FIG. 7 illustrates results obtained after testing whether DLC certification requirements are met as the angle θ between the two inclined surfaces of the heat dissipation cover 10 is changed. In particular, FIG. 7 illustrates whether spacing criteria requirements for a parabolic troffer and a prismatic troffer are met.

Referring to FIG. 7, when the angle θ between the two inclined surfaces is equal to or greater than 30° and equal to or less than 75°, it is found that DLC certification requirements for a prismatic troffer are met. When the angle θ between the two inclined surfaces is equal to or greater than 50° and equal to or less than 105°, it is found that DLC certification requirements for a parabolic troffer are met.

Accordingly, in order to meet DLC certification requirements for at least one of a prismatic troffer and a parabolic troffer, it is preferable that the angle θ between the two inclined surfaces is a value equal to or greater than 30° and equal to or less than 105°.

In particular, when the angle θ between the two inclined surfaces is 60° or 75°, DLC certification requirements for both a prismatic troffer and a parabolic troffer may be met.

Any inclined surface of the heat dissipation cover 110 may be formed by mounting the support member 115 having an inclined surface on the heat dissipation cover 110. In this case, an overall structure can be simplified and thus manufacturing costs may be reduced.

A heat dissipation space for dissipating heat generated from the LED 140 is formed in the heat dissipation cover 100. Also, a coupling protrusion for coupling the heat dissipation cover 110 to the light-transmitting cover 120 is provided on the heat dissipation cover 110.

The light-transmitting cover 120 is detachably coupled to the heat dissipation cover 110 due to the coupling protrusion to protect the LED 140, and passes light emitted from the LED 140 therethrough. That is, light emitted from the LED 140 passes through the light-transmitting cover 120 to be emitted to the outside.

Figure 8:
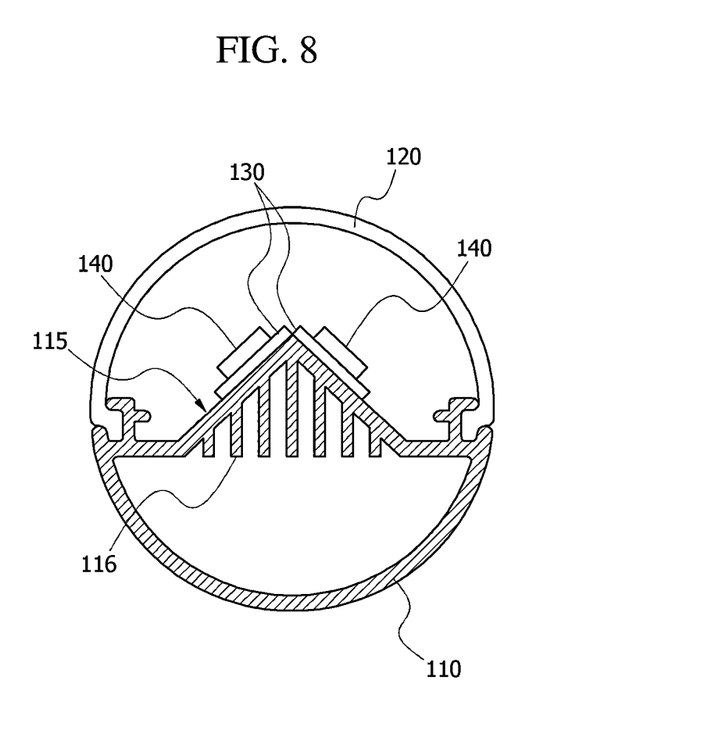
FIG. 8 is a cross-sectional view illustrating a state where a plurality of heat dissipation fins are provided in the tube-type LED illumination lamp of FIG. 4, according to an embodiment of the present invention.
Figure 9:
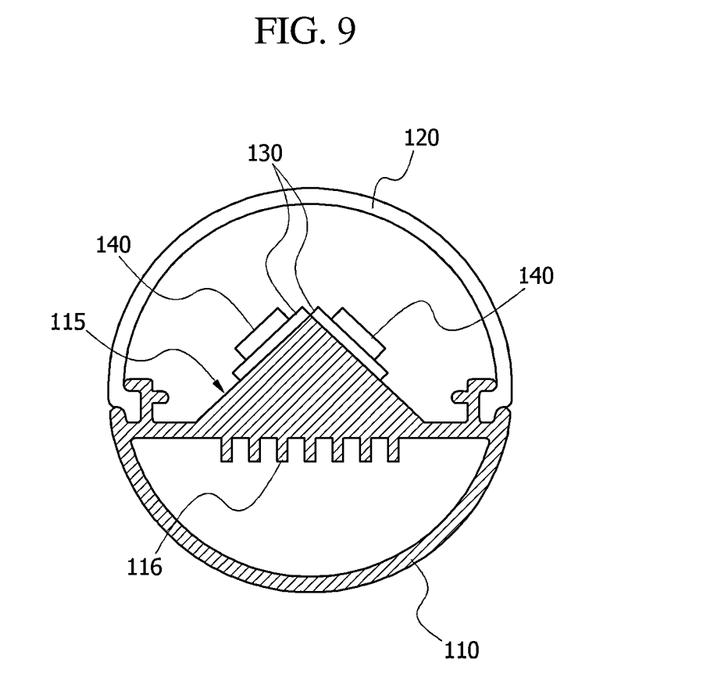
FIG. 9 is a cross-sectional view illustrating a state where a plurality of heat dissipation fins are provided in the tube-type LED illumination lamp of FIG. 4, according to another embodiment of the present invention.

FIGS. 8 and 9 are cross-sectional views illustrating states where a plurality of heat dissipation fins 116 are provided in the tube-type LED illumination lamp of FIG. 4, according to embodiments of the present invention.

Referring to FIG. 8, the plurality of heat dissipation fins 116 for dissipating heat generated from the LED 140 may be formed under the seating surface of the heat dissipation cover 110. Also, referring to FIG. 9, the plurality of heat dissipation fins 116 may be formed under the support member 115 having the inclined surface.

In this case, an interval between the plurality of heat dissipation fins 116 and a length of each of the plurality of heat dissipation fins 116 may vary according to a product and a designer's intentions, as long as a heat dissipation function can be performed.

When the plurality of heat dissipation fins 116 are formed under the seating surface of the heat dissipation cover 110 or under the support member 115, heat dissipation effect can be improved, thereby preventing degradation of the LED 140.

In order to further improve heat dissipation effect of the tube-type LED illumination lamp, a heat absorption plate (not shown) may be disposed between the printed circuit board 130 and the seating surface on which the printed circuit board 130 is mounted. The heat absorption plate may be a copper plate, and may absorb heat generated from the LED 140, thereby further smoothly dissipating heat.

Figure 10:
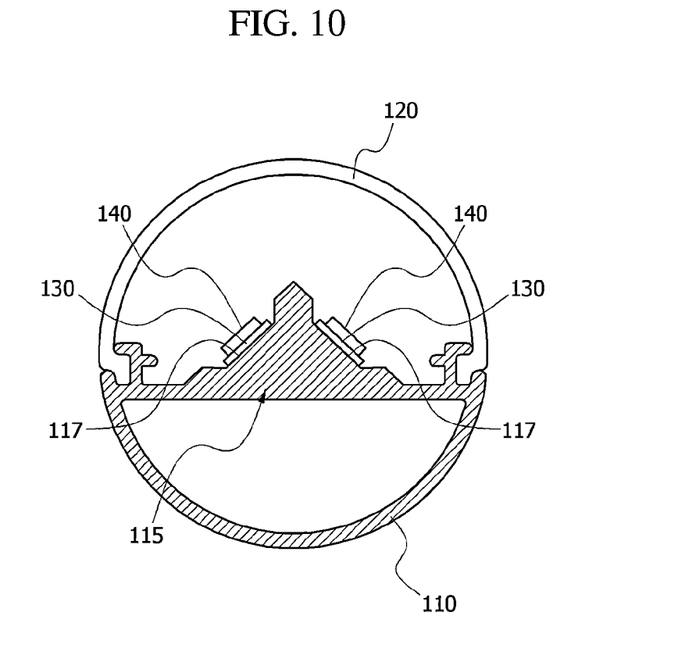
FIG. 10 is a cross-sectional view illustrating a tube-type LED illumination lamp according to another embodiment of the present invention.
Figure 11:
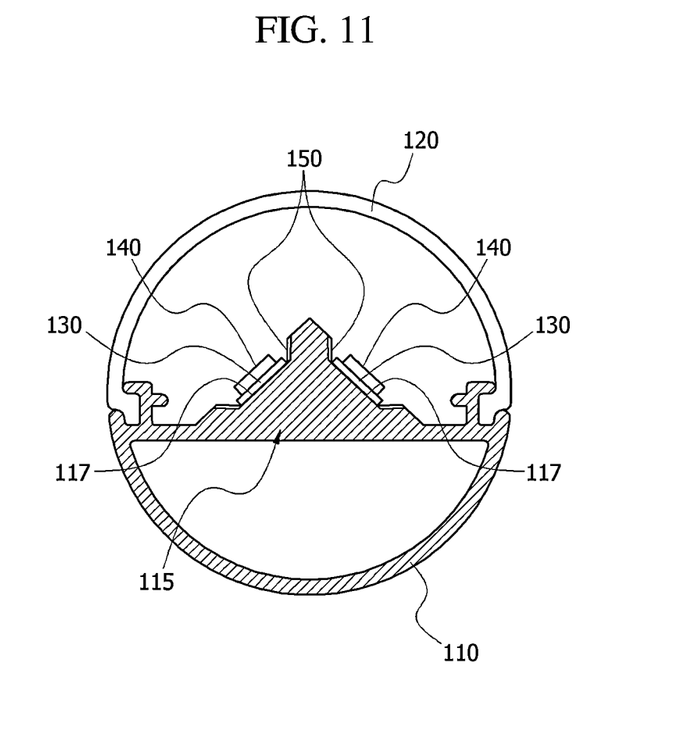
FIG. 11 is a cross-sectional view illustrating a state where reflective plates are provided in the tube-type LED illumination lamp of FIG. 10.

FIG. 10 is a cross-sectional view illustrating a tube-type LED illumination lamp according to another embodiment of the present invention. FIG. 11 is a cross-sectional view illustrating a state where reflective plates 150 are provided in the tube-type LED illumination lamp of FIG. 10.

Referring to FIG. 10, a mounting groove 117 may be formed in each inclined surface of the heat dissipation cover 110, and in this case, the printed circuit board 130 is fixed to a bottom surface of the mounting groove 117.

In this case, the bottom surface of the mounting groove 117 may be formed to be parallel to the inclined surface, and an inner wall of the mounting groove 117 may be formed to have an obtuse angle equal to or greater than 90° with respect to the bottom surface of the mounting groove 117. That is, the mounting groove 117 may be formed to taper toward the bottom surface. An angle between the bottom surface and the inner wall of the mounting groove 117 may be determined according to angles of the reflective plates 150, as will be explained below.

Referring to FIG. 11, the reflective plates 150 may be provided on the inner wall of the mounting groove 117. When the reflective plates 150 are obliquely positioned at both sides of the LED 140, light emitted from the LED 140 may be emitted in a desired direction without loss.

A reflective mirror may be provided on the inner wall of the mounting groove 117 and a lens may be provided over the reflective mirror and the LED 140, to diffuse light emitted from the LED 140 at a greater angle.

In this case, the lens may be provided at an appropriate position according to a gradient of the inclined surface and a desired diffusion angle, and a material of the lens may be variously selected according to a desired refractive index.

Figure 12:
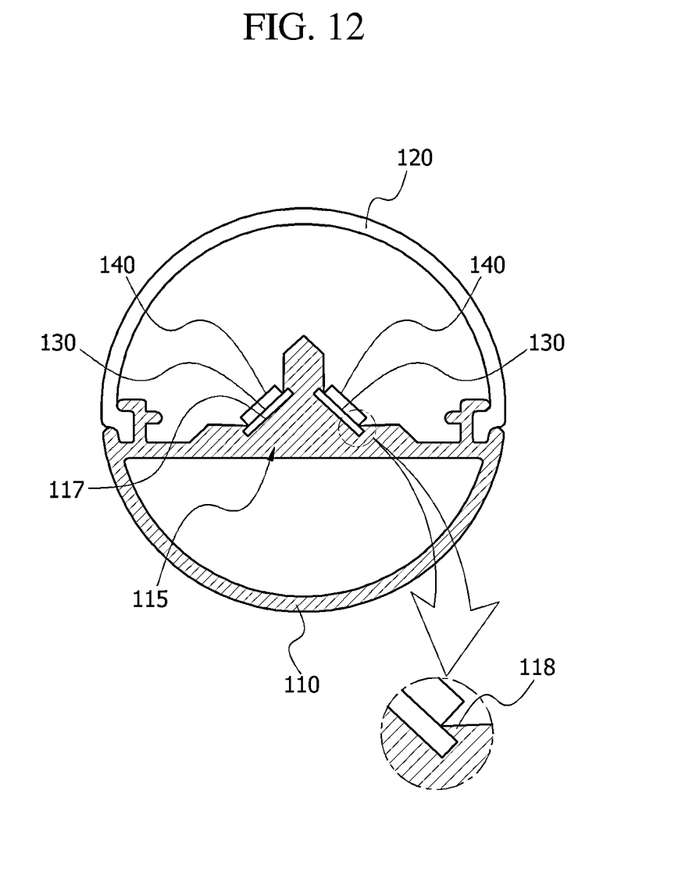
FIG. 12 is a cross-sectional view illustrating a state where a mounting groove is deformed in the tube-type LED illumination lamp of FIG. 10.

FIG. 12 is a cross-sectional view illustrating a state where the mounting groove 117 is deformed in the tube-type LED illumination lamp of FIG. 10.

Referring to FIG. 12, at least one protrusion 118 for fixing the printed circuit board 130 may be formed on the inner wall of the mounting groove 117. That is, when the printed circuit board 130 is inserted into the mounting groove 117, the printed circuit board 130 may be fixed to the bottom surface of the mounting groove 117 due to the protrusion 118.

The printed circuit board 130 may be laterally inserted into a space between the bottom surface of the mounting groove 117 and the protrusion 118 formed on the inner wall. When the protrusion 118 is formed to have elasticity, the printed circuit board 130 may be inserted from an upper side of the mounting groove 117.

In this case, the number, a position, and a shape of the protrusion 118 may be variously selected according to a width or a shape of the printed circuit board 130. For example, two protrusions 118 having the same shape may be formed on the inner wall of the mounting groove 117, or only one protrusion 118 may be formed on the inner wall of the mounting groove 117.

When the printed circuit board 130 is fixed by the protrusion 118 formed on the inner wall of the mounting groove 117, since the printed circuit board 130 does not need to be directly attached to the bottom surface of the mounting groove 117, a manufacturing process can be simplified and only the printed circuit board 130 can be easily separated when the LED 140 is replaced.

That is, when only the printed circuit board 130 has a fault, or only the LED 140 malfunctions, since the printed circuit board 130 can be easily separated from the mounting groove 117, the tube-type LED illumination lamp can be conveniently maintained and repaired.

Figure 13:
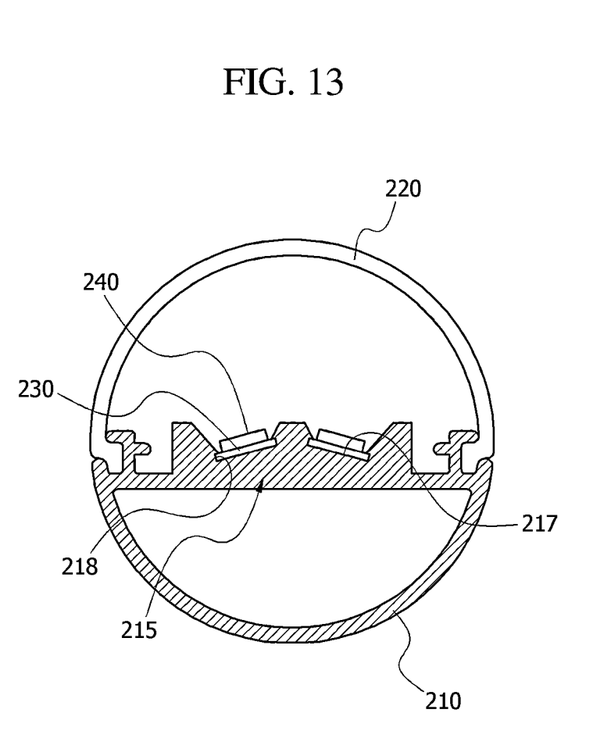
FIG. 13 is a cross-sectional view illustrating a tube-type LED illumination lamp according to another embodiment of the present invention.
Figure 14:
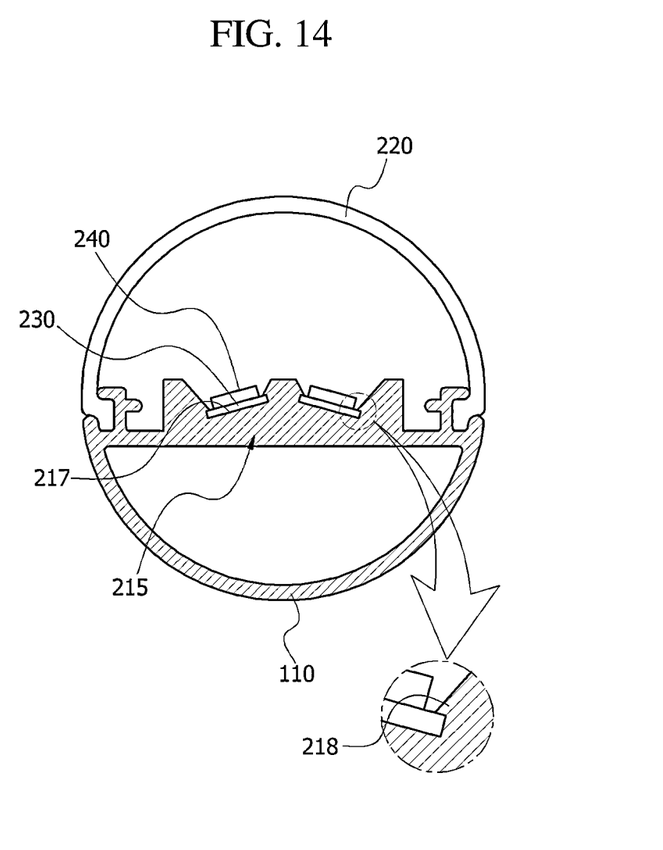
FIG. 14 is a cross-sectional view illustrating a state where a mounting groove is deformed in the tube-type LED illumination lamp of FIG. 13.

FIG. 13 is a cross-sectional view illustrating a tube-type LED illumination lamp according to another embodiment of the present invention. FIG. 14 is a cross-sectional view illustrating a state where a mounting groove 217 is deformed in the tube-type LED illumination lamp of FIG. 13.

Referring to FIG. 13, the mounting groove 217 is formed in a top surface of a support member 215 that has no inclined surface, and a bottom surface of the mounting groove 217 is obliquely formed.

That is, according to the present embodiment, even when a heat dissipation cover 210 or the support member 215 has no inclined surface, since the bottom surface of the mounting groove 217 is obliquely formed, two printed circuit boards 230 may be obliquely positioned. Accordingly, a diffusion angle of light emitted from an LED 240 can be increased, thereby improving illuminance quality of the tube-type LED illumination lamp.

Also, referring to FIG. 14, at least one protrusion 218 may be formed on an inner wall of the mounting groove 217, and the printed circuit board 230 may be fixed to the bottom surface of the mounting groove 217 due to the protrusion 218.

As described above, when the printed circuit board 130 is fixed by the protrusion 218 formed on the inner wall of the mounting groove 117, since the printed circuit board 130 does not need to be directly attached to the bottom surface of the mounting groove 130, a manufacturing process can be simplified, only the printed circuit board 130 can be easily separated when the LED 240 is replaced, and the tube-type LED illumination lamp can be conveniently maintained and repaired.

According to embodiments of the present invention, since a light diffusion angle can be increased by obliquely positioning a printed circuit board on which an LED is placed, illuminance quality of an LED illumination lamp can be improved.

Also, according to embodiments of the present invention, since the printed circuit board may be fixed by a protrusion formed on an inner wall of a mounting groove, the printed circuit board can be easily separated when the LED is replaced, and thus the LED illumination lamp can be conveniently maintained and repaired.

While the invention has been shown and described with reference to certain exemplary embodiments thereof, it will be understood by those skilled in the art that various changes in form and details may be made therein without departing from the spirit and scope of the invention as defined by the appended claims.

What is claimed is:

1. A tube-type light-emitting diode (LED) illumination lamp comprising:
    at least one printed circuit board on which at least one LED is placed; and
    a heat dissipation cover having at least one seating surface on which each printed circuit board is disposed,
    wherein the seating surface is obliquely formed such that said each printed circuit board is mounted on each inclined surface,
    wherein a mounting groove is formed in said each inclined surface, and said each printed circuit board is fixed to a bottom surface of the mounting groove, and
    wherein a reflective plate is provided on an inner wall of the mounting groove.

2. The tube-type LED illumination lamp of claim 1, wherein the mounting groove is formed to taper toward the bottom surface.

3. The tube-type LED illumination lamp of claim 1, wherein a protrusion is formed on the inner wall of the mounting groove and said each printed circuit board is fixed to the bottom surface by the protrusion when being inserted into the mounting groove.

4. A tube-type LED illumination lamp comprising:
    at least one printed circuit board on which at least one LED is placed; and
    a heat dissipation cover having at least one seating surface on which each printed circuit board is disposed,
    wherein the seating surface is obliquely formed such that said each printed circuit board is mounted on each inclined surface,
    wherein a mounting groove is formed in said each inclined surface and said each printed circuit board is fixed to a bottom surface of the mounting groove, and
    wherein a reflective mirror is provided on an inner wall of the mounting groove, and a lens is provided over the reflective mirror and the LED.

5. The tube-type LED illumination lamp of claim 1, wherein a heat absorption plate is disposed between said each printed circuit board and the bottom surface of the mounting groove.

6. The tube-type LED illumination lamp of claim 1, wherein the inclined surface is formed by mounting a support member having an inclined surface on the heat dissipation cover.

7. The tube-type LED illumination lamp of claim 1, wherein an angle between two inclined surfaces of the heat dissipation cover is equal to or greater than 30° and equal to or less than 105°.

8. The tube-type LED illumination lamp of claim 1, wherein a plurality of heat dissipation fins are formed under the seating surface.

9. A tube-type light-emitting diode (LED) illumination lamp comprising:
    at least one printed circuit board on which a plurality of LEDs are placed;
    a heat dissipation cover having at least one seating surface on which each printed circuit board is disposed, the heat dissipation cover having a semi-cylinder shape; and
    a light-transmitting cover having a semi-cylinder shape and separated from the heat dissipation cover, the light-transmitting cover being coupled with the heat dissipation cover to form a tube-type body,
    wherein the seating surface is obliquely formed such that said each printed circuit board is mounted on each inclined surface,
    wherein an angle between two inclined surfaces of the heat dissipation cover is greater than 45° and less than 90°, and
    wherein the plurality of LEDs face the light-transmitting cover.

* * * * *